Patented Oct. 13, 1931

1,827,604

UNITED STATES PATENT OFFICE

BIRGER W. NORDLANDER, OF SCHENECTADY, NEW YORK, ASSIGNOR TO GENERAL ELECTRIC COMPANY, A CORPORATION OF NEW YORK

VULCANIZATION OF RUBBER

No Drawing. Application filed May 16, 1927. Serial No. 191,935.

The present invention comprises a process of vulcanizing rubber which may be carried out at a relatively low temperature.

I have found that amorphous sulphur which may be produced by various methods is more active than ordinary crystalline sulphur as a vulcanizing agent for rubber, and that such sulphur is capable of vulcanizing rubber at moderate temperatures, that is, at temperatures below the melting point of sulphur. At present the vulcanization of rubber by means of crystalline sulphur is carried out at temperatures which are not materially below the melting point of sulphur. Amorphous sulphur, especially when in contact with the crystalline sulphur is unstable chemically and loses its activity in a short time going over into the less active crystalline forms.

In accordance with my invention the vulcanization of rubber is carried out with a form of amorphous sulphur containing a stabilizer, that is, a material which retards the conversion of the sulphur from the amorphous to the crystalline form. I have discovered that selenium when associated with sulphur under suitable conditions has the function of stabilizing the sulphur in the amorphous condition, that is, preventing its conversion to the crystalline state. Tellurium also may be used for this purpose.

In order to produce the new sulphur product with which a vulcanization of rubber is carried out in accordance with my invention, sulphur and selenium are melted together in suitable proportions and the product when solidified is subjected to a heat treatment at a temperature slightly below its fusion temperature which converts it into an active condition suitable for carrying out my invention. This product cannot be produced by merely melting together sulphur and selenium as it is essential to subject the product after fusion to solidification and then to heat treatment in order to produce the desired physical and chemical characteristics. Such a product is more fully described and claimed in my copending applications, Serial Nos. 350,856 and 437,619 filed March 28, 1929 and March 20, 1930 respectively. The sulphur-selenium product produced in accordance with the processes herein outlined and as described in my above-mentioned copending applications is a selenium sulphide which is very stable and chemically active and has the composition represented by the formula $SeS_2$. The sulphur atoms therein are very active chemically due to the double bonds by which they are attached to the selenium.

In carrying out my invention, the selenium-sulphur product is produced by melting sulphur and selenium in the proportion of 55 parts of selenium to 45 parts of sulphur by weight. These proportions need not be rigidly adhered to but may be varied widely in accordance with the other conditions.

By fusion a plastic mass is produced which is preferably maintained at a temperature below its melting point which varies in accordance with the amount of selenium present. When employing 55 parts of selenium to 45 parts of sulphur the resulting compound fuses at a temperature about 90° C. In order to accelerate the conversion of the solidified fusion to the brittle state it should be held at a temperature between 80° and 90° for about two hours. In the plastic condition the composition of selenium and sulphur is inactive chemically. When it becomes changed to the hard brittle condition it is highly reactive chemically. In my opinion the plastic mass is a highly polymerized compound or mixture of selenium and sulphur and the effect of the heat treatment is to depolymerize this compound or mixture. The hard, brittle material is non-crystalline and does not become converted to the crystalline condition as does fused sulphur alone after solidification.

The hard, brittle selenium-sulphur body is ground to as fine a state as practicable, for example, in a colloid mill. In its finely ground condition it is incorporated into the rubber in the same manner as finely ground sulphur is incorporated therein, together with other desired compounding ingredients. Although I desire to include within the scope of my invention, the addition of finely ground stable chemically active selenium sulphide to rubber for its vulcanization, I prefer to employ, however, an accelerator there-with. This combination will vulcanize the rubber at lower temperature than ordinary sulphur used with the same accelerator. For example, rubber may be vulcanized in three to five minutes at 85° C. with a mixture by weight of two per cent stable chemically active selenium sulphide and one quarter of one per cent (0.25%) of tetra methyl thiuram disulfide.

In some cases I may associate the stable chemically active selenium sulphide with compounding ingredients, normally used in rubber compounding, such as zinc oxide, whiting, litharge, clay, magnesium oxide or the like. I have, for example, vulcanized rubber containing by weight one per cent of stable chemically active selenium sulphide, ten per cent of zinc oxide, forty per cent of whiting, by heating the compounded rubber to 80 to 90° C. for 2 to 3 hours. With the aid of accelerators this time may be reduced considerably.

The stable chemically active selenium sulphide may also be made by introducing hydrogen sulphide together with selenious acid into water or other suitable liquid menstrum. The selenious acid preferably is introduced drop by drop while the hydrogen sulphide is being slowly bubbled through the water and preferably there is present in the water a coagulant such as aluminum chloride or barium chloride. The precipitate formed by this reaction is collected by filtration. It constitutes an active stable, amorphous powder which may be added without melting or other treatment to rubber as above described.

In accordance with a modification of my invention the stable chemically active selenium sulphide is ground to colloidal fineness either alone or while associated with zinc oxide or other mineral material which it is desired to incorporate into rubber. This finely powdered material or the precipitate formed as described in the preceding paragraph is introduced preferably with an accelerator into colloidal suspension of rubber latex in water. Ammonia may be added to prevent the precipitation of the latex. This colloidal suspension of rubber latex and the stable chemically active selenium sulphide is deposited upon an electrode by the action of an electric current in accordance with the well known electrodeposition process.

What I claim as new and desire to secure by Letters Patent of the United States, is:—

1. The process of vulcanizing rubber at a relatively low temperature which consists in acting thereon with stable chemically active selenium sulphide.

2. The process of vulcanizing rubber at a relatively low temperature which consists in acting thereon with stable chemically active selenium sulphide in the presence of an accelerator.

3. The process of vulcanizing rubber which consists in compounding rubber with stable chemically active selenium sulphide and an accelerator and heating to a temperature of about 80 to 90° C.

4. A composition of matter adapted for the production of vulcanized rubber comprising a mixture of rubber and stable chemically active selenium sulphide.

5. A composition of matter adapted for the production of vulcanized rubber comprising a mixture of rubber, stable chemically active selenium sulphide, and an accelerator.

In witness whereof, I have hereunto set my hand this 14th day of May, 1927.

BIRGER W. NORDLANDER.